Patented Apr. 25, 1944

2,347,436

UNITED STATES PATENT OFFICE 2,347,436

PRINTING INK

Frank B. Root, Montclair, N. J., assignor to Ellis-Foster Company, a corporation of New Jersey No Drawing. Application February 21, 1942,
Serial No. 431,821

4 Claims. (Cl. 260—29)

This invention relates to printing inks of the type which are dried by heat. It also relates to a method of making these inks.

A printing ink consists of coloring matter such as pigments, asphalt or insoluble dyestuffs dispersed in a liquid vehicle. The drying of an ink when impressed as a very thin film on paper depends upon the disappearance of the liquid nature of the vehicle. Drying on paper may occur, depending upon the nature of the vehicle, by oxidation or polymerization to a solid as in the case of drying oils and drying oil varnishes; by evaporation of a volatile portion of the vehicle to leave solid components as in the drying of lacquers; by absorption of part of the vehicle into the paper to leave dry, non-absorbable substances including the pigment on the surface of the paper; by increasing the viscosity of the ink, as from a liquid melt to a solid, by cooling the applied ink from a high temperature to low; or by precipitating a solid binder from the vehicle after printing by addition of a vehicle non-solvent. Heat is used to speed up certain of these drying processes. Rapid drying of ink after printing is important particularly in large-scale printing such as magazines. Furthermore, although rapid drying on paper is essential it is also necessary that the ink does not dry or solidify when in bulk or while on the printing rolls and surfaces. Also, if a press is stopped overnight, it is desirable that no drying on the press occurs, otherwise a wash-up is needed before work is resumed.

The vehicle of heat-drying inks suitable for high-speed printing comprises a solution of a binder in a solvent. The solvent is sufficiently high boiling so that it does not evaporate at ordinary temperatures and not until the paper to which it is applied is subjected to a high temperature. At the drying temperature the solvent flashes off leaving a residue of pigment and binder on the paper. The binder may be thermoplastic and subject to smudging and off-setting while the ink is hot and until the paper is cooled. On the other hand, the binder may be thermosetting, sufficient heat being supplied not only to drive off the solvent but also to cure the binder. The thermosetting binders includes alkyd resins, phenol-aldehyde and urea-formaldehyde resins. Such resins normally require a relatively large amount of solvent to reduce them to a viscosity suitable for ink vehicles and the use of high proportions of heat-volatile liquids decreases the proportion of pigment-binder residue, thus cutting down on the covering power of the ink. To get a desired density of deposit requires greater application of ink with less clearness of impression than with a concentrated ink. Also, such thermosetting resins may require more heat to cure them than merely to drive off the solvent and thus the paper may be harmed by the longer time it is subjected to high heat. Another disadvantage which is associated with such binders as urea-formaldehyde is the physical nature of the solutions which makes them difficult to use as grinding liquids. A grinding liquid must have a suitable amount of tackiness.

It is an object of this invention to produce a printing ink which dries very quickly when subjected to heat but which is non-drying at ordinary temperatures; which is thermosetting so that smudging or off-setting while hot is not encountered; which is of printing consistency but contains a relatively low proportion of heat-volatile liquid, thus permitting high concentration of pigment and binder in the dried film. The binder is of controllable tackiness for incorporation of colors and for printing. Other objects will be apparent from the following.

The heat-drying printing inks of the present invention comprise a pigment dispersed in a vehicle which consists essentially of a solution of a reaction product of an aminotriazine, formaldehyde and a glycerol sulfide in a solvent of boiling point between about 220° and 290° C. The binder or glycerol sulfide reaction product is a soft resinous product whose consistency varies depending upon the relative proportion of the reactants. It is readily soluble in alcoholic solvents and requires a lesser amount of solvent to reach a given viscosity than reaction products unmodified with glycerol sulfide. The reaction product hardens very quickly under heat and thus a printing ink of the heat-drying lacquer type can be produced having a minimum of volatile constituents and producing a maximum of dry residue on the printed surface.

To form the reaction product used herein a mixture of an aminotriazine such as melamine, formaldehyde and a glycerol sulfide is heated at reaction temperature, preferably in the presence of the solvent. Aminotriazines (besides melamine or 2,4,6-triamino-s-triazine) which are adapted to the present invention include such compounds as triphenylmelamine, 2-amino-2,6-bis-phenylamino-s-triazine, 2,4-diamino-6-chlorotriazine, ammeline, thioammeline, thioammeline ethers, etc. Aqueous formaldehyde may be used, or polymers such as paraformaldehyde.

When aqueous aldehyde is employed, water is removed (preferably under reduced pressure) after the reaction. The molecular ratio of triazine to aldehyde varies from 1:2 to about 1:5, lower proportions being preferred on acount of less aldehyde odor during drying.

Glycerol sulfides are obtained by treating a glycerol dichlorhydrin (1,2- or 1,3-dichloropropanol or mixtures of the two) with sodium monosulfide ($Na_2S$). When equal moles of sym.-dichlorohydrin and sodium sulfide are reacted, the product is a very viscous, light-colored liquid which is probably a linear compound and may be represented by the formula:

glycerol monosulfide

When an excess of the dichlorhydrin is employed the products are less viscous and contain chlorine. For example, when 2 moles of sym.-dichlorhydrin are treated with 1 mole of sodium sulfide the product is a clear, light-colored liquid which may be considered to be mainly:

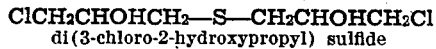
di(3-chloro-2-hydroxypropyl) sulfide

Analogous products are obtained from the unsymmetrical dichlorhydrin. Also, it is possible to consider alkylated products (for example, those derived from beta-methylglycerol). Glycerol sulfides contain hydroxyl groups which are probably the points of combination in the melamine reaction product.

Solvents to be used in the composition include diethylene glycol, triethylene glycol, dipropylene glycol, butyl ether of ethylene glycol, nitrobutanol and other alcoholic compounds (or mixtures thereof) boiling in the same general range. Such solvents do not cause striking through of the ink as is liable to occur with hydrocarbons.

Other reactants may be included. For example, part of the triazine may be replaced by urea, thiourea or phenols. Also, the binder may be blended with solutions of other resins, such resins being soluble in the organic solvents of the triazine binder such as urea-formaldehyde, phenol-aldehyde and alkyd resins.

Besides being very fast setting, a characteristic of the aminotriazine binder of the present invention is that, when dissolved in a solvent such as diethylene glycol to form a concentrated viscous solution it is very tacky so that grinding in of colors is facilitated. The color paste obtained by incorporating pigments is subsequently thinned down to printing consistency by adding more solvent and when thus thinned the tack of the ink is reduced and the parting of the ink film from the type surface to the paper occurs with ease. Drying under heat is rapid and the cured aminotriazine binder is heat-resistant, so that extreme care in controlling the drying temperature is not necessary.

The invention is illustrated by the following examples which relate to the use of melamine, formaldehyde, a glycerol sulfide and a solvent (generally diethylene glycol).

*Example 1*

| | Grams |
|---|---|
| Glycerol monosulfide | 103.5 |
| Melamine | 10.7 |
| 37.5% aqueous formaldehyde | 20.3 |
| Diethylene glycol | 39.3 |

This mixture was heated under a reflux condenser at 90–95° C. for 1 hour. Heating was continued under reduced pressure until the water was removed, leaving a clear, viscous, light-colored solution.

Ink was prepared by grinding 6 g. carbon black with 44 g. of this vehicle and then adding 10 g. diethylene glycol to produce proper consistency for printing. Impressed on bond paper in a thin film the ink dried very quickly under heat to a tack-free, water-insoluble condition. The quick drying of the ink may be illustrated by applying the ink in a thin film to paper and passing the paper over a Bunsen flame at such a rate that the paper does not scorch.

*Example 2*

| | Grams |
|---|---|
| Glycerol monosulfide | 30 |
| Melamine | 11.7 |
| Neutralized formaldehyde solution (37.5%) | 23.5 |
| Diethyl glycol | 16.7 |

These materials were heated at 85–90° C. under reflux for ½ hour and then dehydrated under reduced pressure to give a clear viscous solution.

Six grams carbon black was ground into 44 g. of this vehicle and the paste was reduced with 10 g. diethylene glycol. This formed a very fast drying ink when subjected to heat. The ink does not dry at ordinary temperatures. A layer of the ink was exposed to air for a week without appreciable thickening. Also the ink does not strike through when applied to paper.

*Example 3*

| | Grams |
|---|---|
| Glycerol monosulfide | 52.8 |
| Melamine | 25.2 |
| Paraformaldehyde | 18.0 |
| Diethylene glycol | 28.8 |

The glycerol sulfide was dissolved in the diethylene glycol and the paraform suspended in the solution. The mixture was heated in an open beaker at 85–90° C. and the melamine added gradually. Heating was continued until a drop removed and placed on glass remained clear when cooled to room temperature. The reaction product was clear and light colored.

An ink was produced by grinding 1.6 g. of carbon black with 10 g. of the vehicle. This paste was reduced with 2 g. triethylene glycol, giving a product of good flow. Drying time under heat was very fast and the print was water resistant.

Example 4.—A chlorine-containing glycerol sulfide was made by adding 258 g. glycerol dichlorhydrin (2 moles) gradually to 240 g. sodium sulfide ($Na_2S \cdot 9H_2O$, 1 mole) in 240 g. water. The liquid product was washed thoroughly with water and dried, giving a light-colored oily material, di(3-chloro-2-hydroxypropyl) sulfide. A mixture was made of

| | Grams |
|---|---|
| Above sulfide | 55 |
| Melamine | 17.2 |
| 37.5% aqueous formaldehyde | 33 |
| Diethylene glycol | 28 |

After heating under a reflux condenser at 85–90° C. until clear (½ hour), the solution was dehydrated under reduced pressure to give a viscous liquid. A film of the material when baked for 1 hour at 100° C. was clear, hard and water resistant.

An ink was made by grinding 6 g. carbon black into 44 g. of the vehicle giving a thick paste which was thinned to printing consistency with 10 g. triethylene glycol. Printing and drying properties were satisfactory and the print was water resistant.

Example 5.—To illustrate the effect of a glycerol sulfide when reacted with melamine and formaldehyde, a reaction product was made in which this substance was omitted. A melamine-paraform composition was made by thoroughly mixing 45 g. melamine with 51 g. diethylene glycol and then adding 38.4 g. paraformaldehyde. Reaction was carried out at 80° C. with the mixture kept neutral to bromthymol blue by adding KOH dissolved in diethylene glycol. After heating for 3 hours a clear light-colored solution formed which when cold became very stiff so that 10 g. of diethylene glycol was added to make the viscosity comparable to that of Examples 2 and 3. This solution contains 42% of solvent (diethylene glycol), whereas the vehicle of Example 2 contains only 25% solvent and Example 3, 23% solvent.

Ground with 10% carbon black this formed an ink which required further reducing with diethylene glycol. When printed the ink dried but excessive heat was necessary to convert it to a water-insoluble form.

The following examples represent modifications of the ink formula of Example 2.

|  | Example | | | | |
|---|---|---|---|---|---|
|  | 6 | 7 | 8 | 9 | 10 |
| Vehicle of Example 2 | 22 | 44 | 44 | 44 | 44 |
| Vehicle of Example 5 | 22 | | | | |
| Diethylene glycol | 10 | 5 | | | 10 |
| Mentor #30 | | 5 | | | |
| 2% solution soap in diethylene glycol | | | 10 | | |
| 10% solution ethocel in 2-nitrobutanol | | | | 10 | |
| Carbon black | 6 | 6 | 6 | 6 | |
| Chromium oxide | | | | | 47 |

In these examples the pigment was ground into the vehicle and reduced with further solvent or solvent and modifier.

Example 6 represents a mixture of the inks of Examples 2 and 5, and is an improvement over Example 5 in heat conversion.

Example 7 uses a small amount of an immiscible hydrocarbon thinner of boiling point about 260° C. (sold under the name of Mentor #30) which is emulsified in the ink to lessen the tack thereof for printing. Heat conversion is very good.

Example 8 uses a small amount of soap to remove tack during printing, soap being very effective in this combination.

Example 9 employs a nitroalcohol in the solvent mixture. Cellulose ethers appear to thicken the ink without greatly increasing the tack and also cause a rapid setup under heat. (Ethocel is the name of a commercial grade of cellulose ethyl ether.)

Example 10 is related to Example 2 except that it is a different color. Drying characteristics are about the same.

I claim:

1. A printing ink adapted to dry quickly to a non-smudging deposit under heat which comprises a pigment dispersed in a liquid vehicle which contains a reaction product of an aminotriazine, formaldehyde and a glycerol sulfide containing free hydroxyl groups, dissolved in an alcohol of boiling point between about 220° and 290° C.

2. A printing ink adapted to dry quickly under heat to a non-smudging deposit which comprises a pigment dispersed in a liquid vehicle which contains the reaction product of melamine, formaldehyde and a glycerol sulfide containing free hydroxyl groups, dissolved in an alcohol of boiling point between about 220° and 290° C.

3. A printing ink adapted to dry quickly under heat to a non-smudging deposit which comprises a pigment dispersed in a liquid vehicle which contains the reaction product of melamine, formaldehyde and glycerol monosulfide dissolved in an alcohol of boiling point between about 220° and 290° C.

4. A printing ink adapted to dry quickly to a non-smudging deposit under heat which comprises a pigment dispersed in a liquid vehicle which contains a reaction product of melamine, formaldehyde and a glycerol sulfide containing free hydroxyl groups, dissolved in diethylene glycol.

FRANK B. ROOT.